May 25, 1943. J. W. THROCKMORTON 2,320,251
THERMAL CONVERSION OF HYDROCARBON GASES
Filed Dec. 28, 1940
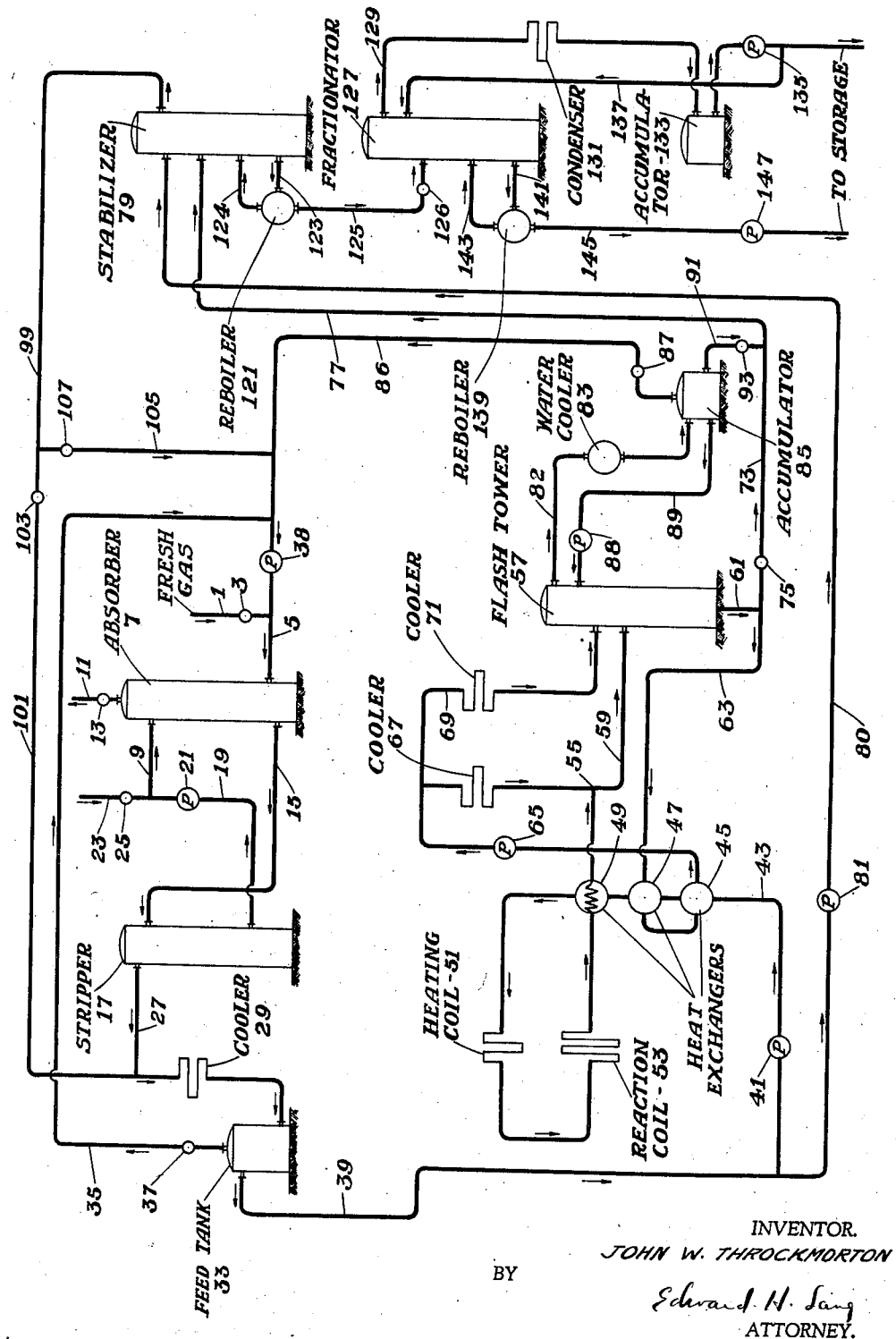
INVENTOR.
JOHN W. THROCKMORTON
BY
Edward H. Lang
ATTORNEY.

UNITED STATES PATENT OFFICE 2,320,251

THERMAL CONVERSION OF HYDROCARBON GASES

John W. Throckmorton, Wilton, Conn., assignor to The Pure Oil Company, Chicago, Ill., a corporation of Ohio Application December 28, 1940, Serial No. 372,145

4 Claims. (Cl. 196—10)

This invention relates to the conversion of hydrocarbon gases to liquid hydrocarbons and is more particularly concerned with the pyrolytic conversion of hydrocarbon gases under high temperatures and superatmospheric pressures.

In the pyrolytic conversion of hydrocarbon gases to gasoline and other higher boiling hydrocarbons, it is common practice to either quench the reaction products leaving the reaction zone by direct contact of the hot reaction products with cooler liquid medium or to cool the reaction products by indirect heat interchange. Both methods of cooling have their disadvantages. Where direct quenching is practiced prior to indirect heat exchange utilization of the heat in the reaction products for heating the charge to the reaction zone is not as efficient due to the lower mean temperature difference between the two, thereby making the cost of operation greater than it would otherwise be.

On the other hand, where indirect cooling is resorted to, as, for example, by passing the charging stock into indirect heat interchange with the reaction products, excess carbon deposition takes place in the heat exchanger and transfer line, making necessary more frequent shutdown of the plant, with resultant loss of time and efficiency.

It has been discovered that the disadvantages of both methods of cooling reaction products can be to a large extent obviated and the benefits of both methods realized by carefully regulating the extent to which the reaction products are cooled by indirect heat exchange prior to quenching the partially cooled products with cooling liquid. It has been observed that partial reduction in the temperature of the reaction products can be obtained by indirect heat interchange without any substantial carbon deposition if cooling is not carried below the dew point of the reaction products. By dew point is meant that point at which droplets of liquid form and separate out of the reaction mixture under the particular pressure conditions existing.

By utilizing the heat remaining in the hot reaction products issuing from the reaction zone, the charge to the reaction zone can be preheated to a fairly high temperature, resulting in a large saving in fuel and furnace cost. After the temperature of the reaction mixture has been reduced to a point at or close to the dew point, it is suddenly chilled to a temperature below the dew point by direct contact with cooler liquid, preferably a liquid which will in large part remain in a liquid state under the temperature and pressure conditions existing after the reaction products are chilled.

In the pyrolytic conversion of gases to high boiling hydrocarbons, a certain amount of very high boiling material of the nature of tar and asphalt forms. If the reaction products are permitted to cool sufficiently to permit these high boiling materials to condense and drop out of the reaction stream, they deposit in the transfer line or in the heat exchanger, gradually building up a deposit therein. These deposits undergo further cracking in certain portions of the transfer line and heat exchanger where the temperature is sufficiently high and result in a solid gummy or carbonaceous mass which eventually clogs the line and/or heat exchanger. But if the temperature of the reaction products is maintained sufficiently high to prevent any substantial amount of the tar or asphaltic material from condensing out prior to quenching, this material dissolves in or is carried along in suspension in the quench liquid into the fractionating zone and can be eliminated in the liquid body which collects in the zone without causing clogging.

It is the primary object of this invention to utilize the heat remaining in the reaction products from a gas conversion zone without causing undesirable deposition of carbon or carbonaceous material from the reaction products.

It is a further object of this invention to utilize the heat in the reaction products from a gas conversion zone to preheat the charge to the conversion zone and at the same time prevent undesirable deposition of carbon or carbonaceous material from the reaction products.

Further objects of the invention will become apparent from the following description taken in conjunction with the accompanying drawing of which the single figure is a diagrammatic side elevational view of apparatus for practicing the invention.

Referring to the drawing, numeral 1 indicates a line through which fresh gas may be charged to the system by means of compressor or other suitable device. From the line 1 gas passes through valve 3 into line 5 from which it enters the bottom of absorber 7. The fresh gas charged to the system may be all or a portion of natural gas, gases produced in the pyrolytic and/or catalytic cracking of mineral oil, or a mixture of such gases. The gas passes upwardly through the absorber 7 in countercurrent contact with a descending stream of absorption menstruum such as light gas oil which enters the upper part of the absorber through the line 9. The absorber may be maintained under a superatmospheric pressure ranging from approximately 150 to 400 lbs. per square inch. It will be understood that a series of absorbers may be used or separate absorbers may be used for the fresh gas and the recycle gas and these absorbers operated under different conditions of pressure and/or temperature. These features are all well known in the art and form no part of the invention.

In the absorber substantially all $C_3$ and higher boiling hydrocarbons are absorbed together with a considerable portion of $C_2$ hydrocarbons. The greater part of the hydrogen, methane and a portion of the $C_2$ hydrocarbons remains unabsorbed.

The gas which is unabsorbed is eliminated from the top of the absorber through line 11 controlled by valve 13. The rich absorption menstruum is withdrawn from the bottom of the absorber through line 15 and charged into the stripper 17 where it is denuded of the absorbed gases. The lean absorption menstruum is withdrawn from the stripper through line 19 by means of pump 21 and returned to the top of the absorber through line 9. Make-up oil may be pumped into the absorber when necessary through line 23 controlled by valve 25.

The gases liberated in the stripper which consist primarily of $C_3$ and $C_4$ hydrocarbons with a substantial proportion of $C_2$ hydrocarbons and very little methane and hydrogen, are withdrawn through line 27, passed through cooler 29 where the temperature may be lowered to approximately 75° F., and then charged to feed tank 33. The stripper 17 is operated under superatmospheric pressure so that the major portion of the gases liberated therein after cooling will condense to liquid and be collected as a liquid in the feed tank 33. The feed tank may be maintained under a pressure ranging from approximately 125 to 375 lbs. per square inch. Any gas which does not condense in the tank 33 is withdrawn therefrom through line 35 controlled by valve 37 and returned by means of pump 38 and line 5 to the absorber.

The liquefied gas is withdrawn from tank 33 through line 39 and a portion thereof charged by means of pump 41 through line 43, heat exchangers 45, 47 and 49, into the inlet of the heating coil 51. In passing through the series of heat exchangers, the charging stock may be heated to a temperature of 450°–600° F., depending on the temperature of the reaction products and the extent of heat exchange contact therewith. In the pump 41 the pressure on the charge may be raised to approximately 500 to 2000 lbs. per square inch. In the heating coil 51 the charging stock may be heated to a temperature of approximately 900° to 1200° F., depending on the nature of the charging stock and the nature and yield of the final products desired. Charging stocks of higher olefin concentration generally require lower reaction temperatures than do lower olefin containing gases. Likewise, higher boiling paraffinic hydrocarbons such as butane do not require as high temperatures for conversion as do lower boiling constituents such as propane.

From the heating coil 51 the products may pass to a reaction coil 53 of sufficient length and cross-sectional area to give the heated products time to react to the desired extent. The coil 53 is preferably of greater cross-sectional area than the heating coil 51, thereby decreasing the velocity of the reaction products and increasing the time during which the products remain in the reaction zone. The reaction coil 53 is preferably placed in a zone which can be heated and/or cooled as necessary to maintain the desired reaction temperature. The amount of heating or cooling necessary is dependent on the concentration of olefins in the charging stock. The temperature that is preferably maintained in the reaction coil 53 is approximately the same temperature at which the gases leave the heating coil 51, or slightly lower. As the reaction products emerge from the reaction coil 53 they pass through the tubes in heat exchanger 49 in indirect heat exchange with the fresh charge. In the heat exchanger 49 the reaction products may be cooled to a temperature of approximately 400° to 800° F., depending upon their composition and the pressure under which they are maintained. Higher pressure and higher concentration of high boiling constituents necessitate higher temperatures to avoid cooling below the dew point. Immediately upon emerging from the heat exchanger 49 the partially cooled reaction products are quenched by injecting cooler liquid hydrocarbons directly into the stream at point 55. At point 55 the temperature of the reaction products is suddenly reduced from approximately 400° F. or above to a temperature of approximately 250°–500° F. The quenched products then enter the lower portion of flash tower 57 through line 59.

In the exchanger 49 the reaction products are cooled to a temperature which approximately represents the dew point of the reaction mixture. It is preferable to keep the temperature slightly above rather than slightly below the dew point in order to guard against excessive depositions. By carrying the temperature of the reaction products down close to the dew point the full benefit of the heat in the reaction products in preheating the charge can be realized.

Although any inert liquid may be used as the quenching medium, a substantial portion of which remains liquid under the temperature and pressure conditions at which the reaction products are quenched, it is preferred to use condensate formed in the process. To this end condensate is withdrawn from the bottom of the flash tower 57 through lines 61 and 63 by means of pump 65. Since this condensate may be at a temperature of approximately 250°–500° F., it is first passed through heat exchangers 47 and 45 in indirect heat exchange with the charging stock in order to partially cool the condensate and give up a portion of its heat to the fresh charge and is then, if necessary, passed through cooler 67 to further reduce its temperature before being injected into the reaction products at the point 55. The quenching oil or condensate may have its temperature reduced to approximately 150°–225° F. before contacting it with the reaction products to be quenched. A portion of the condensate withdrawn from the bottom of the flash tower 57 may also be charged by pump 65 through line 69 and cooler 71 into the upper portion of the flash tower 57 to act as reflux liquid.

A portion of the condensate withdrawn from the flash tower 57 through line 61 is passed through line 73, controlled by valve 75, and line 77 into the mid-portion of main fractionating tower or stabilizer 79. A portion of the charging stock from feed tank 33 may be withdrawn through line 80 by means of pump 81 and charged to the upper portion of tower 79 as reflux liquid.

The pressure in flash tower 57 will be somewhat lower than the pressure in the reaction coil due to the drop occurring in the transfer line. If desired, the pressure may be further reduced by placing a suitable valve in the transfer line. A pressure of 300 to 500 lbs. per square inch has been found to be satisfactory. The temperature conditions maintained in the bottom and top of the flash tower may be such as to enable the taking overhead of the major portion of the normally gaseous constituents and a portion of the gasoline boiling hydrocarbons. The vapors and gases which are not condensed in the flash tower 57 are removed from the upper portion thereof through the line 82 and water cooler 83 where they are cooled sufficiently to produce a condensate containing gasoline boiling hydrocarbons, the major portion of the $C_3$—$C_4$ hydrocarbons, a portion of the $C_2$ hydrocarbons and some methane and then pass to accumulator 85. In the cooler 83 the vapors may be cooled to a temperature of approximately 75°–100° F. Any gas which remains uncondensed is withdrawn from the accumulator 85 through line 86 controlled by valve 87 and returned through line 5 to the absorber. A portion of the condensate in the accumulator 85 may be returned by means of pump 88 and line 89 to the upper portion of the flash tower 57 as reflux liquid. The remainder of the liquid from accumulator 85 is withdrawn through line 91, controlled by valve 93, and joins the liquid in line 73 from the bottom of flash tower 57 and enters stabilizer 79. The pressure is reduced at the valve 93 to approximately that maintained in stabilizer 79.

In the fractionating tower 79 $C_4$ and lighter hydrocarbons are taken over head through line 99 and are either joined with the gases emerging from the stripper through line 27 by passing through line 101 controlled by valve 103, or charged to absorber 7 through line 105 controlled by valve 107. A portion of the $C_4$ hydrocarbons may remain in the liquid. Tower 79 may be maintained under superatmospheric pressure of approximately 250 lbs. per square inch with a top temperature of 145° F. and bottom temperature of 420° F. The condensate in the bottom of the fractionator 79 is heated by being passed into reboiler 121 through line 123. Vapors from the reboiler re-enter the fractionating tower through line 124. The liquid from the reboiler which is composed of gasoline and higher boiling hydrocarbons is withdrawn through line 125 to valve 126 where the pressure is reduced and charged into the fractionator 127. In the fractionator 127 the gasoline boiling hydrocarbons are taken overhead through line 129, condensed in condenser 131 and passed to accumulator 133. From the accumulator 133 the gasoline distillate is withdrawn by means of pump 135 to storage or to further treatment if required. A portion of the gasoline distillate may be recycled through line 137 to the upper part of fractionator 127 as reflux condensate. The liquid which accumulates in the bottom of the stripper is charged to a reboiler 139 through line 141 and vapors are returned from the boiler to the fractionator through line 143. The unvaporized residue comprising those hydrocarbons boiling above the gasoline boiling range, are withdrawn from the reboiler 139 through line 145 by means of pump 147 to storage.

In the actual operation of a plant in accordance with the invention, the feed tank 33 was maintained under a pressure of 235 lbs. per square inch and at a temperature of 75° F. The composite liquefied gas in feed tank 33 had the following composition in mole percent:

| | |
|---|---:|
| $H_2S+CO_2$ | 0.3 |
| $CH_4$ | 1.5 |
| $C_2H_4$ | 2.8 |
| $C_2H_6$ | 14.4 |
| $C_3H_6$ | 22.6 |
| $C_3H_8$ | 44.2 |
| $C_4H_8$ | 7.3 |
| $C_4H_{10}$ | 6.0 |
| Heavier than $C_4$ hydrocarbons | 0.9 |

The liquefied gas was taken from the tank by the pump 41 and raised to a pressure of 700 lbs. per square inch. The temperature of the gas leaving the heat exchanger 49 was 470° F. and this temperature was raised to 1080° F. in the heating coil 51 and maintained at this temperature in the reaction coil 53. The pressure at the outlet of the reaction coil was 530 lbs. per square inch. Reaction products leaving the reaction coil had the following composition in mole percent:

| | |
|---|---:|
| $H_2S+CO_2$ | 0.2 |
| $H_2$ | 0.9 |
| $CH_4$ | 12.6 |
| $C_2H_4$ | 5.1 |
| $C_2H_6$ | 15.0 |
| $C_3H_6$ | 17.0 |
| $C_3H_8$ | 35.0 |
| $C_4H_8$ | 4.8 |
| $C_4H_{10}$ | 4.3 |
| Heavier than $C_4$ hydrocarbons | 5.1 |

The temperature of the reaction products was reduced from 1080° F. to 800° F. in the heat exchanger 49 and was quenched from 800° to 400° F. by means of the cool condensate at 55. The condensate used for quench was cooled to 175° F. The flash tower 57 was maintained under a pressure of 425 lbs. per square inch. The bottom of the tower was maintained at a temperature of 370° F. and the top of the tower was maintained at a temperature of 215° F. The accumulator 85 was maintained under a pressure of 415 lbs. per square inch and a temperature of 85° F. The fractionating tower 79 was maintained under a pressure of 245 lbs. per square inch with the bottom maintained at a temperature of 420° F. and the top at a temperature of 145° F. The fractionator 127 was operated at a pressure slightly above atmospheric. Under these conditions the unit was able to operate for a period of 25 days without requiring shutdown for cleaning. At the end of this period the deposition in the transfer line from the reaction tubes to the flash tower and in the heat exchanger tubes 49 was found to consist of a little light coke so small in amount as to cause substantially no building up of back pressure.

The exit gas from the absorber had the following composition in mol. percent:

| | |
|---|---:|
| $H_2S+CO_2$ | 1.5 |
| $CH_4$ | 64.5 |
| $C_2H_4$ | 9.9 |
| $C_2H_6$ | 24.1 |
| $C_3$ and heavier hydrocarbons | Trace |

The recycle ratio, that is, the ratio of the liquid volume of the charge to the conversion zone, to the liquid volume of $C_3+C_4$ hydrocarbons converted per pass was 6 to 1.

It will be understood that the operating conditions under which conversion takes place and under which fractionation of the charging material and the reaction products takes place may vary over wide limits, but it is essential that the temperature to which the reaction products are cooled by indirect heat exchange be not substantially lower than the dew point of the reaction mixture and that the partially cooled reaction products be quickly quenched before reduction in temperature below the dew point takes place in order to prevent condensation and deposition of resinous and carbonaceous material in the transfer line.

It is claimed:

1. In a process for converting hydrocarbon gases into liquid hydrocarbons at elevated temperatures between approximately 900 and 1200° F. at which the reaction products remain in the vapor phase, the steps of reducing the reaction products by indirect heat exchange with charging gases to a temperature close to but not below the dew point thereof and then suddenly reducing the temperature of the partially cooled reaction products below the dew point by direct contact with cooler liquid of such nature that a large portion thereof remains liquid at the temperature to which the reaction products are reduced.

2. A process in accordance with claim 1 in which the reaction products are cooled from a temperature above 900° F. to a temperature not substantially below 700° F. by indirect heat interchange and from a temperature not substantially below 700° F. to a temperature substantially below 700° F. by direct contact with cooler liquid of such nature that a large portion thereof remains liquid at the temperature to which the reaction products are reduced.

3. A process in accordance with claim 1 in which the reaction products are cooled from a temperature above 900° F. to a temperature of approximately 800° F. by indirect heat interchange and from a temperature of approximately 800° F. to a temperature of approximately 400° F. by direct contact with cooler liquid of such nature that a large portion thereof remains liquid at the temperature to which the reaction products are reduced.

4. A process in accordance with claim 1 in which the gases are converted under a pressure above 500 lbs. per square inch, the reaction products are partially cooled by heat interchange with charging gas to a temperature of approximately 650° to 800° F. and the partially cooled reaction products quickly cooled by means of direct contact with cooler liquid to a temperature of approximately 250° to 500° F.

JOHN W. THROCKMORTON.